United States Patent
Hirschmann et al.

(10) Patent No.: US 10,724,455 B2
(45) Date of Patent: Jul. 28, 2020

(54) METHOD FOR ASSISTED UPSHIFTING AND DEVICE FOR THIS PURPOSE

(71) Applicant: MAN Truck & Bus AG, München (DE)

(72) Inventors: Steffen Hirschmann, Neustadt an der Aisch (DE); Thomas Malischewski, Heilsbronn (DE); Dominic Hyna, Fürth (DE)

(73) Assignee: MAN TRUCK & BUS AG, Munich (DE)

(*) Notice: Subject to any disclaimer, the term of this patent is extended or adjusted under 35 U.S.C. 154(b) by 146 days.

(21) Appl. No.: 15/983,760

(22) Filed: May 18, 2018

(65) Prior Publication Data
US 2018/0334975 A1 Nov. 22, 2018

(30) Foreign Application Priority Data
May 18, 2017 (DE) .......................... 10 2017 004 818

(51) Int. Cl.
*F02D 41/02* (2006.01)
*F02D 13/02* (2006.01)
(Continued)

(52) U.S. Cl.
CPC ....... *F02D 41/023* (2013.01); *F02D 13/0246* (2013.01); *F02D 13/04* (2013.01);
(Continued)

(58) Field of Classification Search
CPC ............... F02D 41/023; F02D 13/0246; F02D 13/0257; F16H 63/50; F16H 2306/54; B60W 2710/0644; B60W 30/19
See application file for complete search history.

(56) References Cited

U.S. PATENT DOCUMENTS

| 5,947,863 A * | 9/1999 | Grob ..................... B60W 10/06 477/109 |
| 6,293,248 B1 | 9/2001 | Zsoldos et al. |

(Continued)

FOREIGN PATENT DOCUMENTS

| DE | 69402134 T2 | 6/1997 |
| DE | 10047141 A1 | 3/2001 |

(Continued)

OTHER PUBLICATIONS

European Search Report for related case EP 18170965.0, dated Oct. 9, 2018.

(Continued)

*Primary Examiner* — Sherry L Estremsky
(74) *Attorney, Agent, or Firm* — Maginot, Moore & Beck LLP

(57) ABSTRACT

The invention relates to a method for assisted upshifting in a gear change of a transmission connected to a combustion engine. The method comprises the initiation of an upshifting process. The method comprises the reduction of an engine speed of the combustion engine by switching to an engine-braking mode, wherein a variable valve gear, in particular a trip cam system, of the combustion engine serves for switching to the engine-braking mode. Alternatively or in addition, in the engine-braking mode a first exhaust valve of the combustion engine is at first kept closed during the compression stroke and/or during the exhaust stroke for the compression of air and is opened before reaching a top dead centre of a piston movement for decompression of the compressed air.

18 Claims, 7 Drawing Sheets

(51) Int. Cl.
*F16H 63/50* (2006.01)
*F02D 13/04* (2006.01)
*F02D 41/00* (2006.01)

(52) U.S. Cl.
CPC ......... *F02D 41/0007* (2013.01); *F16H 63/50* (2013.01); *F02D 13/0257* (2013.01); *F02D 2041/001* (2013.01); *F02D 2200/101* (2013.01)

(56) References Cited

U.S. PATENT DOCUMENTS

| | | | | |
|---|---|---|---|---|
| 6,553,306 | B2* | 4/2003 | Sayman | F02D 41/023 123/321 |
| 7,048,671 | B2* | 5/2006 | Morisawa | B60W 10/02 477/109 |
| 9,816,435 | B2* | 11/2017 | Granstrom | F02B 61/06 |
| 2004/0260443 | A1 | 12/2004 | Berglund et al. | |
| 2006/0199699 | A1 | 9/2006 | Berglund et al. | |
| 2010/0288217 | A1* | 11/2010 | Stolk | F01L 1/047 123/90.17 |
| 2015/0066318 | A1 | 3/2015 | Park et al. | |
| 2018/0297581 | A1* | 10/2018 | Shrestha | F02D 41/023 |

FOREIGN PATENT DOCUMENTS

| | | |
|---|---|---|
| DE | 10242758 A1 | 3/2004 |
| DE | 60206638 T2 | 7/2006 |
| DE | 102008005639 A1 | 7/2009 |
| DE | 102011002142 A1 | 10/2012 |
| DE | 102013113741 A1 | 3/2015 |
| EP | 0638455 A1 | 2/1995 |
| WO | 2018013037 A1 | 1/2018 |
| WO | WO-2019161935 A1 * 8/2019 ............ B60W 10/11 |

OTHER PUBLICATIONS

Search report from German Patent Office in corresponding application DE102017004818, dated Oct. 17, 2017.

* cited by examiner

METHOD FOR ASSISTED UPSHIFTING AND DEVICE FOR THIS PURPOSE

TECHNICAL FIELD

The invention relates to a method for assisted upshifting and to a variable valve gear.

BACKGROUND OF THE INVENTION

In the field of commercial vehicles, the reduction in engine speed in order to bring the engine and transmission speeds into line with one another when shifting up a gear is typically facilitated by means of existing engine-brake flaps. Depending on the location of the flap (upstream or downstream of an exhaust turbocharger) it can take a relatively long time to reduce the engine speed, since the exhaust gas has to be built up upstream of the flap as far as the combustion chamber. The piston must expel the exhaust gas in the cylinder in opposition to the accumulated exhaust gas in the exhaust tract. Additional work is involved. As a result, the engine speed is reduced.

Besides the length of time involved in reducing the engine speed by means of the engine-brake flap, the known method has the further disadvantage that a turbocharger lag can occur at the end of the upshifting process. The reason for this is that the flow through the exhaust-gas turbine of the exhaust turbocharger is reduced due to the build-up of exhaust gas and the boost pressure therefore falls considerably in the engine-braking mode.

BRIEF SUMMARY OF THE INVENTION

The object of the invention is to provide an improved method for assisted upshifting and a device for this purpose, which in particular shorten the upshifting process and afford a higher boost pressure at the end of the upshifting process.

The object is achieved by a method for assisted upshifting and a variable valve gear according to the independent claims. Advantageous developments are described in the dependent claims and the description.

The method for assisted upshifting in a gear change of a transmission connected to a combustion engine comprises the initiation of an upshifting process and the reduction of an engine speed of the combustion engine by switching to an engine-braking mode. In the engine-braking mode a first exhaust valve of the combustion engine is at first kept closed during the compression stroke and/or during the exhaust stroke for the compression of air and is opened before reaching a top dead centre of a piston movement for decompression of the compressed air. Alternatively or in addition, a variable valve gear, in particular a trip cam system, of the combustion engine serves for switching to the engine-braking mode.

The decompression at the end of the compression stroke and/or at the end of the exhaust stroke affords a very rapid engine-braking effect, since exhaust gas does not have to be first built up upstream of an exhaust gas throttle valve. The speed can thereby be reduced in a short time, making it possible to achieve a rapid upshifting process. In addition or alternatively, the engine-braking mode is provided by the variable valve gear through a variation of the valve timing curves. This allows an engine-braking mode in which there is no need for adjustment of an exhaust gas throttle valve, so that a turbine speed of an exhaust-gas turbine is reduced to a lesser degree. This serves to reduce or prevent a turbocharger lag following the upshifting process.

In particular, in the engine-braking mode negative work may be performed by the respective cylinder of the combustion engine.

During the engine-braking mode, in particular no fuel may be delivered to the cylinders operated in the engine-braking mode and ignition cannot occur.

The method may be used, in particular, for assisted upshifting in a gear change of a transmission, in particular a fully automatic transmission, which is connected to a combustion engine.

It goes without saying that multiple (first) exhaust valves of different cylinders of the combustion engine can be switched to the engine-braking mode.

In a further variant the trip cam system comprises a cam carrier, arranged so that it is rotationally fixed and axially displaceable on a camshaft of the combustion engine and having the first cam and the second cam arranged offset in a longitudinal direction of the camshaft.

In an especially preferred design variant the method additionally comprises the maintenance and/or increasing of a boost pressure and/or a turbocharger speed of a turbocharger of the combustion engine. This is made possible by expelling of the compressed air to an exhaust-gas turbine of the turbocharger during the compression stroke and/or during the exhaust stroke through opening of the first exhaust valve before reaching the top dead centre of the piston movement. This has the advantage that a turbocharger lag after upshifting can be prevented or at least reduced.

In one exemplary embodiment the method comprises the sensing of a required speed reduction for the upshifting process, a required torque increase for the upshifting process, a desired duration of the upshifting process, a desired turbocharger speed, particularly at the end of the upshifting process, and/or a desired boost pressure, particularly at the end of the upshifting process. The step of reducing the engine speed of the combustion engine by switching to the engine-braking mode is performed, in particular, as a function of the required speed reduction, the required torque increase, the desired duration of the upshifting process, the desired turbocharger speed and/or the desired boost pressure. It is consequently possible to avoid any use and therefore, for example, material wear of the shift system when only small speed reductions are required, for example.

A first group of cylinders may preferably be switched to the engine-braking mode during the upshifting process. A second group of cylinders of the combustion engine may continue to be operated in the normal mode during the upshifting process.

In particular, a number of cylinders in the first group and/or the second group may be determined as a function of the required speed reduction, the required torque increase, the desired duration of the upshifting process, the desired turbocharger speed and/or the desired boost pressure. More or fewer cylinders can thereby be operated in the engine-braking mode during the upshifting process, depending on requirements (for example the required load step).

In a preferred variant, assignment to the first group and/or to the second group is made on a rolling basis, in particular between successive upshifting processes. Material wear to the shift system can therefore be evenly spread.

In a further design variant the second cam is designed so that the first exhaust valve opens at between 100° CA and 60° CA (crankshaft angle) before reaching the top dead centre, closes after opening during the exhaust stroke in the range between the top dead centre and 30° CA after the top dead centre, and/or closes after opening during the compression stroke in the range between the bottom dead centre and 30° CA after the bottom dead centre. A considerable engine-braking effect can thereby be achieved due to the two-fold decompression.

In a further embodiment the method comprises keeping a second exhaust valve of the combustion engine closed during the upshifting process. The second exhaust valve is, in particular, assigned to the same cylinder of the combustion engine as the first exhaust valve. Keeping the second exhaust valve closed serves to reduce a load on the shift system during the engine-braking mode, since the second exhaust valve does not also have to be opened against the pressure in the cylinder.

The second exhaust valve may, in particular, be kept closed during the upshifting process by means of a cam-free portion of the trip cam system.

In a development the trip cam system comprises a first cam for a normal operating mode of the combustion engine and a second cam for the engine-braking mode of the combustion engine. The trip cam system places either the first cam and the first exhaust valve in operative connection, or the second cam and the first exhaust valve in operative connection. The trip cam system provides a reliable and especially rapid system for switching to the engine-braking mode.

In an advantageous development switching to the engine-braking mode comprises the switching over from the first cam to the second cam by the trip cam system and the actuation of the first exhaust valve by means of the second cam. The second cam at first keeps the first exhaust valve closed during the compression stroke and/or during the exhaust stroke and opens it before reaching the top dead centre of the piston movement.

In a variant the second exhaust valve is kept closed during the upshifting process by means of a cam-free portion of the trip cam system.

In a design variant the method comprises the switching over from the second cam to the first cam by the trip cam system when the engine speed has been reduced to a desired speed, in particular a transmission speed of the transmission connected to the combustion engine. The upshifting process can thereby be terminated and the combustion engine can again be operated entirely in the normal operating mode.

In one embodiment the variable valve gear comprises a first group of trip cam systems and a second group of trip cam systems. During the upshifting process the first group actuates the corresponding first exhaust valve by means of the corresponding second cam. During the upshifting process the second group actuates the corresponding first exhaust valve by means of the corresponding first cam, which opens the first exhaust valve during the exhaust stroke.

In particular, a number of trip cam systems in the first group and/or the second group can be determined as a function of a required speed reduction for upshifting, a required torque increase for upshifting, a desired duration of the upshifting process, a desired turbocharger speed, particularly at the end of the upshifting process, and/or a desired boost pressure, particularly at the end of the upshifting process. If an especially brief upshift duration is desired, for example, multiple or all trip cam systems can be switched over to the respective second cam for actuating the respective first exhaust valve.

In an advantageous development the number of trip cam systems in the first group increases with an increase in the required speed reduction, an increase in the required torque increase, a shortening of the desired duration of the upshifting process, an increase in the desired turbocharger speed and/or an increase in the desired boost pressure.

In a preferred variant, assignment of the trip cam systems to the first group and to the second group is made on a rolling basis, in particular between successive upshifting processes. Material wear to the trip cam systems can therefore be evenly spread.

In a further exemplary embodiment, the upshifting process is initiated automatically as a function of an engine speed and/or a throttle valve position. An automatic transmission, in particular, can be used this.

In one embodiment the transmission is shifted from one gear to another gear with a higher transmission ratio during the upshifting process.

The invention also relates to a variable valve gear for a combustion engine of a motor vehicle, in particular a commercial vehicle. The variable valve gear comprises a first exhaust valve, a camshaft and a trip cam system. The trip cam system comprises a cam carrier, which is arranged so that it is rotationally fixed and axially displaceable on the camshaft and comprises a first cam and a second cam. The first cam and the second cam are arranged offset in a longitudinal direction of the camshaft. The variable valve gear comprises a control unit, which is designed to perform the method for assisted upshifting as disclosed herein.

The term "control unit" refers to control electronics which are capable of assuming open and/or closed-loop control functions, depending on the design.

The cam carrier is preferably arranged so that it is axially displaceable between a first axial position and a second axial position on the camshaft. The valve gear further comprises a transmission device. In the first axial position of the cam carrier the transmission device is in operative connection between the first cam and the first exhaust valve. In the second axial position of the cam carrier the transmission device is in operative connection between the second cam and the first exhaust valve. The first cam is designed for a normal operating mode of the combustion engine, in which the first cam keeps the first exhaust valve open during the exhaust stroke. The second cam is designed for an engine-braking mode of the combustion engine, in which the second cam at first keeps the first exhaust valve closed during the compression stroke and/or during the exhaust stroke and opens the first exhaust valve before reaching a top dead centre of a piston movement of a piston of the combustion engine.

It goes without saying that whilst the second cam is in engagement with the first transmission device the intake valve(s) continue to open only during the intake stroke. No fuel is introduced, however, and no ignition of a mixture ensues The first cam and the second cam may have a different cam contour and/or may be arranged offset in relation to one another in a circumferential direction of the cam carrier.

In one exemplary embodiment the cam carrier comprises a third cam, which is designed like the first cam, and a cam-free portion. The first cam, the second cam, the third cam and the cam-free portion are arranged offset in a longitudinal direction of the camshaft. In particular, the first cam adjoins the second cam and the third cam adjoins the cam-free portion. The incorporation of a third cam and the cam-free portion means that in the braking mode a second exhaust valve can be actuated in a manner different from the first exhaust valve. In the normal operating mode, the second exhaust valve, on the other hand, can be actuated in the same way as the first exhaust valve, since the third cam and the first cam are identically formed.

The cam-free portion is also referred to as a zero cam. The cam-free portion comprises a cylindrical circumferential surface with no lobe for actuating the transmission device.

The valve gear preferably comprises a second exhaust valve, which in particular is assigned to the same cylinder as the first exhaust valve, and a second transmission device. In the first axial position of the cam carrier the second transmission device is in operative connection between the third cam and the second exhaust valve. In the second axial position of the cam carrier the second transmission device keeps the second exhaust valve closed due to the formation of the cam-free portion. Here the cam-free portion may be in or out of engagement with the second transmission device.

It goes without saying that in the second axial position of the cam carrier the second transmission device is not in operative connection with any other cam of the cam carrier.

This design has the advantage that only the first exhaust valve is used for the braking mode. Then, whilst the first exhaust valve is used for the braking mode, the second exhaust valve remains closed throughout the entire cycle. This makes it possible to reduce the stresses on the variable valve gear. High surface unit pressures ensue between the cam and the contact area of the transmission device, particularly when an exhaust valve opens against the pressure in the cylinder. In embodiments in which both exhaust valves are actuated during the braking mode the variable valve gear needs to be of correspondingly more robust design.

In an alternative exemplary embodiment, the valve gear further comprises a second exhaust valve, which in particular is assigned to the same cylinder as the first exhaust valve. In the first axial position of the cam carrier the first transmission device is additionally in operative connection between the first cam and the second exhaust valve, and in the second axial position it is additionally in operative connection between the second cam and the second exhaust valve.

The first cam and the third cam may have a similar cam contour and/or may be arranged in alignment with one another in a circumferential direction of the cam carrier.

This design has the advantage that both exhaust valves are used for the braking mode. Both exhaust valves are actuated via the same transmission device and the same cam.

In a design variant the cam carrier comprises a first meshing channel for axial displacement of the cam carrier in a first direction. The first meshing channel in particular extends helically.

The first meshing channel is designed, in engagement with an actuator, to displace the cam carrier axially, for example from the first axial position to the second axial position or from the second axial position to the first axial position.

In an especially preferred exemplary embodiment the first meshing channel is arranged in the cam-free portion. In other words, the first meshing channel extends in the zero cam.

Such a design affords the advantage that the cam-free portion is used firstly for the axial displacement. Secondly, the cam-free portion ensures that the second exhaust valve is not opened in the engine-braking mode. The functional integration makes it possible to reduce the overall dimensions of the cam carrier.

In a further design variant, the first meshing channel and/or the cam-free portion is/are arranged between the first cam and the third cam or at one end of the cam carrier. The arrangement of the cam, the cam-free portion and the first meshing channel can be flexibly adapted to the particular requirements.

In one embodiment the cam carrier comprises a second meshing channel for axial displacement of the cam carrier in a second direction which is opposed to the first direction. The second meshing channel is arranged between the first cam and the third cam or at one end of the cam carrier. The second meshing channel may, in particular, extend helically.

The second meshing channel is designed, in engagement with an actuator, to displace the cam carrier axially, for example from the first axial position to the second axial position or from the second axial position to the first axial position. The first and second meshing channels afford a reliable facility for displacement of the cam carrier.

In a further embodiment the variable valve gear comprises a first actuator, which is designed to engage selectively with the first meshing channel for displacement of the cam carrier in the first direction. Alternatively or in addition, the variable valve gear comprises a second actuator, which is designed to engage selectively with the second meshing channel for displacement of the cam carrier in the second direction.

The camshaft advantageously comprises an arresting mechanism having an elastically pre-tensioned element, which in the first axial position of the cam carrier engages in a first recess in the cam carrier and in the second axial position of the cam carrier engages in a second recess in the cam carrier.

The arresting mechanism has the advantage that the cam carrier can be fixed in the first and second axial position. The cam carrier can therefore not be accidentally displaced along a longitudinal direction of the camshaft.

In a further exemplary embodiment, the first transmission device and/or the second transmission device take the form of a lever, in particular a rocker lever or a finger-type rocker, or a tappet. A finger-type rocker may be used, for example, in the case of an overhead camshaft. A rocker lever may be used, for example, in the case of a bottom-mounted camshaft.

In a further design variant, the camshaft is arranged as an overhead camshaft or a bottom-mounted camshaft. Alternatively or in addition, the camshaft is part of double camshaft system, which additionally comprises a further camshaft for actuating at least one intake valve.

In a further embodiment the camshaft for the exhaust valve(s) and/or the further camshaft for the intake valve(s) may comprise a phase adjuster. The phase adjuster is designed to adjust an angle of rotation of a camshaft relative to an angle of rotation of a crankshaft. The phase adjuster can therefore allow an adjustment of the valve timings for the respective valves. The phase adjuster may take the form, for example, of a hydraulic phase adjuster, in particular an oscillating motor phase adjuster. Such an embodiment has the advantage that the flexibility of the system is further increased through combination with the displaceable cam carrier.

In a further design variant, the second cam is designed so that the first exhaust valve is opened with a greater valve lift after opening in the compression stroke than after opening in the exhaust stroke. Alternatively or in addition, the second cam is designed so that the first exhaust valve is opened with a smaller valve lift than in the case of the first cam. The provision of multistage valve lifts which are smaller than the valve lifts during the normal operating mode reduces the stress on the valve gear. The valve gear is heavily stressed particularly when an exhaust valve opens against the pressure in the cylinder.

In embodiments in which the second cam is also used for actuating the second exhaust valve, the comments here, which relate to the action of the second cam on the first exhaust valve, apply equally to the second exhaust valve. In embodiments in which the third cam is used for actuating the second exhaust valve, the comments here, which relate to the action of the first cam on the first exhaust valve, apply equally to the third cam and the second exhaust valve.

Finally, the invention also relates to a motor vehicle, in particular a commercial vehicle, having a variable valve gear as disclosed herein. The commercial vehicle may be a truck or a bus, for example.

The preferred embodiments and features of the invention described above can be freely combined with one another. Further details and advantages of the invention are described below, referring to the drawings attached, in which:

DETAILED DESCRIPTION OF THE DRAWINGS

Figure 1:
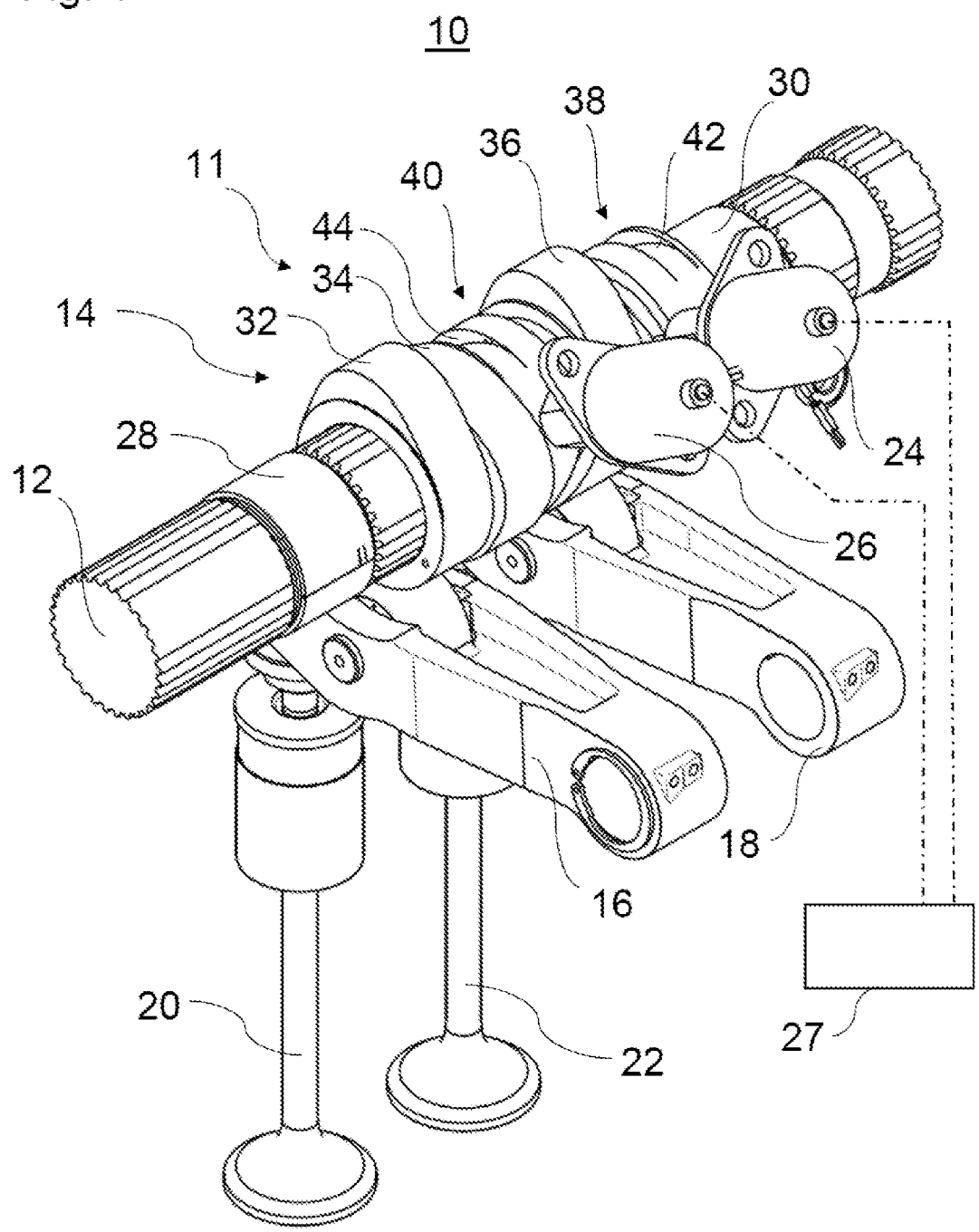
FIG. 1 shows a perspective view of an example of a variable valve gear.

The embodiments shown in the figures correspond at least partially to one another, so that similar or identical parts are provided with the same reference numerals and are also explained through reference to the description of the other embodiments and figures, in order to avoid repetitions.

Figure 2:
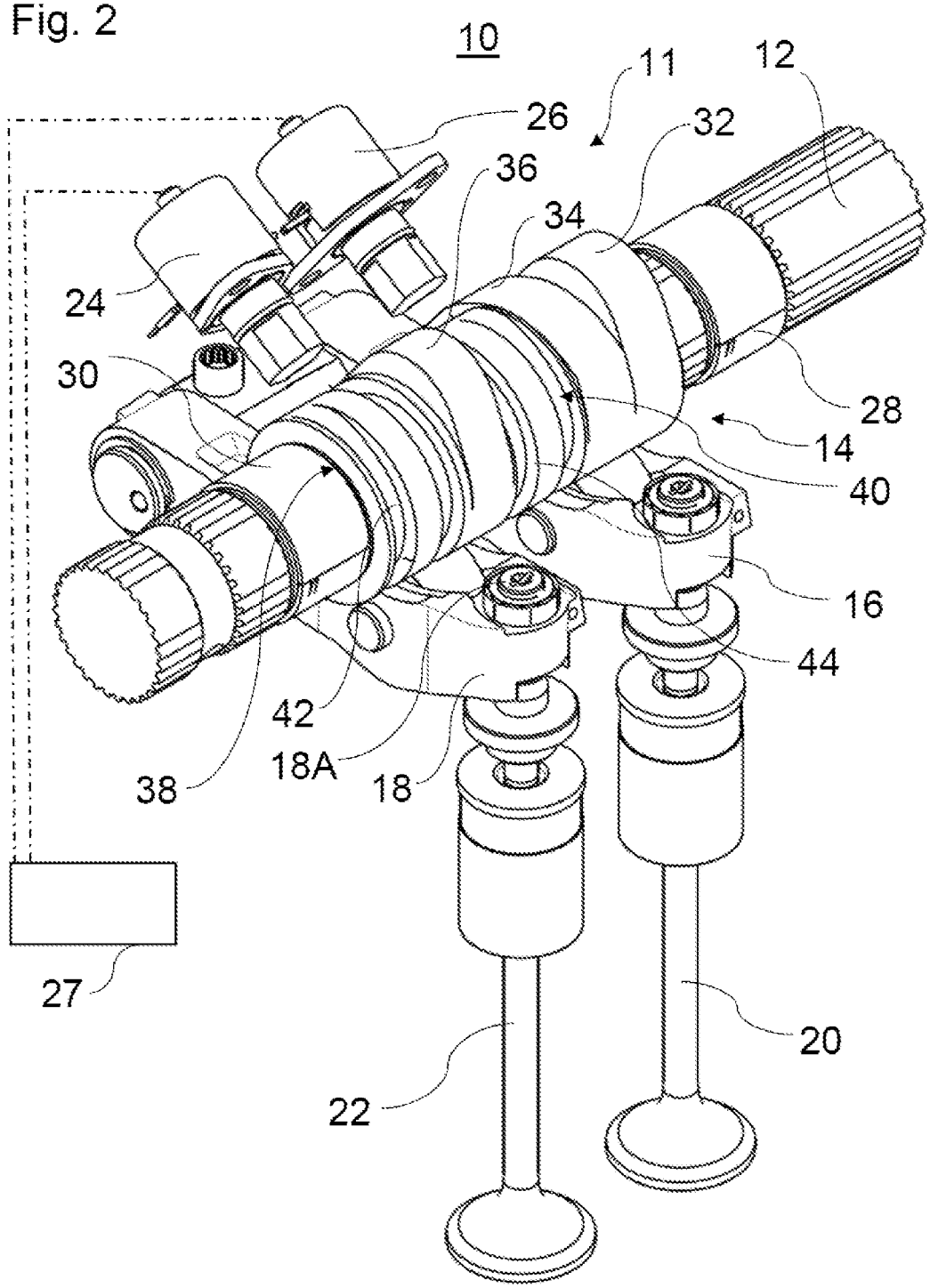
FIG. 2 shows a further perspective view of the example of a variable valve gear.
Figure 3:
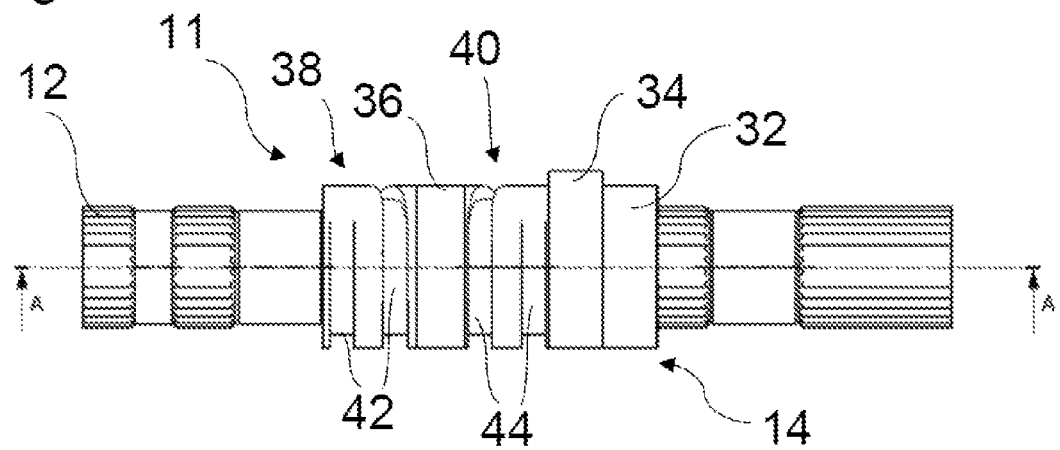
FIG. 3 shows a top view of a camshaft of the example of a variable valve gear.

FIGS. 1 and 2 show a variable valve gear 10. The variable valve gear 10 comprises a camshaft 12 and a cam carrier 14. In addition, the variable valve gear 10 comprises a first and second transmission device 16 and 18 together with a first and second exhaust valve 20 and 22. The variable valve gear 10 moreover comprises a first actuator 24 and a second actuator 26. The cam carrier 14, the transmission devices 16 and 18 and the actuators 24 and 26 form a trip cam system 11.

The camshaft 12 is embodied as an exhaust camshaft, which actuates exhaust valves 20 and 22. The camshaft 12 is part of a double camshaft system (not represented in detail), which additionally comprises an intake camshaft (not represented) for actuating one or more intake valves. The camshaft 12 is arranged together with the intake camshaft. The camshaft 12 and the intake camshaft therefore form a so-called double overhead camshaft (DOHC) system. Alternatively, the camshaft 12 might also form a so-called single overhead camshaft (SOHC) system. In other embodiments the camshaft 12 may also be arranged as a bottom-mounted camshaft.

The cam carrier 14 is arranged, rotationally fixed on the camshaft 12. The cam carrier 14 is arranged so that it is additionally axially displaceable along a longitudinal axis of the camshaft 12. The cam carrier 14 may be axially displaceable between a first stop 28 and a second stop 30.

The cam carrier 14 is described below, referring to FIGS. 1 to 4. The cam carrier 14 comprises three cams 32, 34 and 36, which are offset in relation to one another in a longitudinal direction of the cam carrier 14 and the camshaft 12. The first cam 32 is arranged at a first end of the cam carrier 14 and is designed for a normal operating mode, as described in detail later by way of example. The second cam 34 is arranged adjacent to the first cam 32 and is designed for an engine-braking mode, as is likewise described in detail later by way of example. The engine-braking mode can be used for slowing and/or braking the motor vehicle in downhill driving. The engine-braking mode may also be used to reduce an engine speed of the motor vehicle for assisted upshifting when changing gear to a higher gear. The third cam 36 is arranged at an interval from the second cam 34 and from the second end of the cam carrier 14. The third cam 36 is designed for the normal operating mode. The third cam 36 is formed in the same way as the first cam 32.

The cam carrier 14 moreover comprises a first cam-free portion 38 and a second cam-free portion 40. The first cam-free portion 38 is arranged at the second end of the cam carrier 14. The second cam-free portion 40 is arranged between the second cam 34 and the third cam 36. In the first cam-free portion 38 a first meshing channel (shift gate) 42 extends helically around a longitudinal axis of the cam carrier 14. In the second cam-free portion 40 a second meshing channel (shift gate) 44 extends helically around the longitudinal axis of the cam carrier 14.

For displacing the cam carrier 14 between the stops 28 and 30, the actuators 24 and 26 (FIGS. 1 and 2) can engage selectively with extendable elements (not shown in detail) in the meshing channels 42, 44. In detail, the first actuator 24 can engage selectively in the first meshing channel 42 for displacing the cam carrier 14 from one axial position to another axial position. In a first axial position the cam carrier 14 bears on the second stop 30. In a second axial position the cam carrier 14 bears on the first stop 28. In FIGS. 1 to 4 the cam carrier is represented in the first axial position. The second actuator 26 in turn can engage selectively in the second meshing channel 44. The cam carrier 14 is then displaced from the first axial position to the second axial position. The first actuator 24 and the second actuator 26 are controlled by a schematically represented control unit 27 (FIGS. 1 and 2).

The displacement is initiated by the extended element of the respective actuator 24, 26 being immobilized in an axial direction of the camshaft 12. Consequently, the displaceable cam carrier 14 is displaced in a longitudinal direction of the camshaft 12 due to the helical form of the meshing channels 42, 44 when the extended element engages in the respective meshing channel 42, 44. At the end of the displacement process the displaceable element of the respective actuator 24, 26 is guided by the respective meshing channel 42, 44 in the opposite direction to the extending direction and is therefore retracted. The displaceable element of the respective actuator 24, 26 disengages from the respective meshing channel 42, 44.

The first transmission device 16 and the second transmission device 18 (FIGS. 1 and 2) establish an operative connection between the cam carrier 14 and the exhaust valves 20, 22. The first exhaust valve 20 is actuated (opened) when the first cam 32 or the second cam 34 depresses the first transmission device 16. The second exhaust valve 22 is actuated (opened) when the third cam 36 depresses the second transmission device 18.

If the cam carrier 14 is situated in the first axial position (as shown in FIGS. 1 to 4), the first transmission device 16 is in operative connection between the first cam 32 and the first exhaust valve 20. In other words, in the first axial position of the cam carrier 14 the first transmission device 16 is not in operative connection between the second cam 34 and the first exhaust valve 20. The first exhaust valve 20 is actuated according to a contour of the first cam 32. In the second axial position of the cam carrier 14 the first transmission device 16 is in operative connection between the second cam 34 and the first exhaust valve 20. The first exhaust valve 20 is actuated according to a contour of the second cam 34.

In the first axial position of the cam carrier 14 the second transmission device 18 is in operative connection between the third cam 36 and the second exhaust valve 22. The second exhaust valve 22 Is actuated according to a contour of the third cam 36. In the second axial position of the cam carrier 14 the second transmission device 18 does not actuate the second exhaust valve 22. In the second axial position of the cam carrier 14 a contact area 18A of the second transmission device 18 lies on the same axial position relative to the camshaft 12 as the first cam-free portion 38. The first cam-free portion 38 does not comprise any lobe for actuating the second transmission device 18. If the cam carrier 14 is in the second axial position, the second exhaust valve 22 is not actuated.

The first cam-free portion 38 therefore has two functions. On the one hand the first cam-free portion 38 accommodates the first guide channel 42. On the other the first cam-free portion 38 serves to ensure that the second exhaust valve 42 is not actuated in the second axial position of the cam carrier 14. This functional integration is advantageous for reasons of overall space.

In the embodiment represented the first transmission device 16 and the second transmission device 18 each take the form of a finger-type rocker. In other embodiments the transmission devices 16 and 18 may take the form of rocker levers or tappets. In some embodiments the transmission devices 16 and 18 may comprise cam followers, for example in the form of rotatable rollers.

Figure 4:
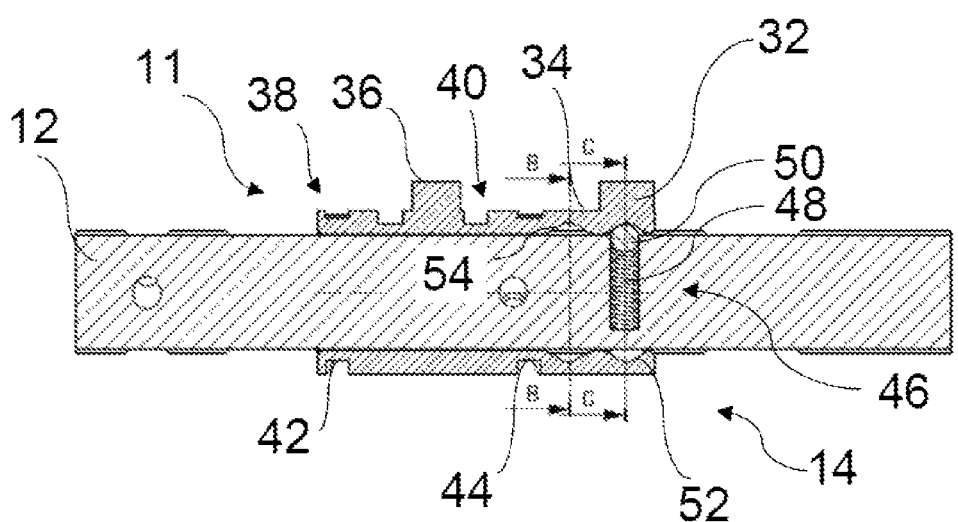
FIG. 4 shows a view in longitudinal section of the camshaft in FIG. 3 along the line A-A.

Referring to FIG. 4, an arresting mechanism 46 is shown. The arresting mechanism 46 comprises an elastic element 48 and a detent 50. The elastic element 48 is arranged in a blind hole of the camshaft 12. The elastic element 48 pretensions the detent 50 against the cam carrier 14. A first and second recess 52 and 54 are arranged in an inner circumferential surface of the cam carrier 14. For arresting the cam carrier 14, the detent 50 is pressed into the first recess 52 when the cam carrier 14 is in the first axial position. In the second axial position of the cam carrier 14 the detent 50 is pressed into the second recess 54.

Figure 5:
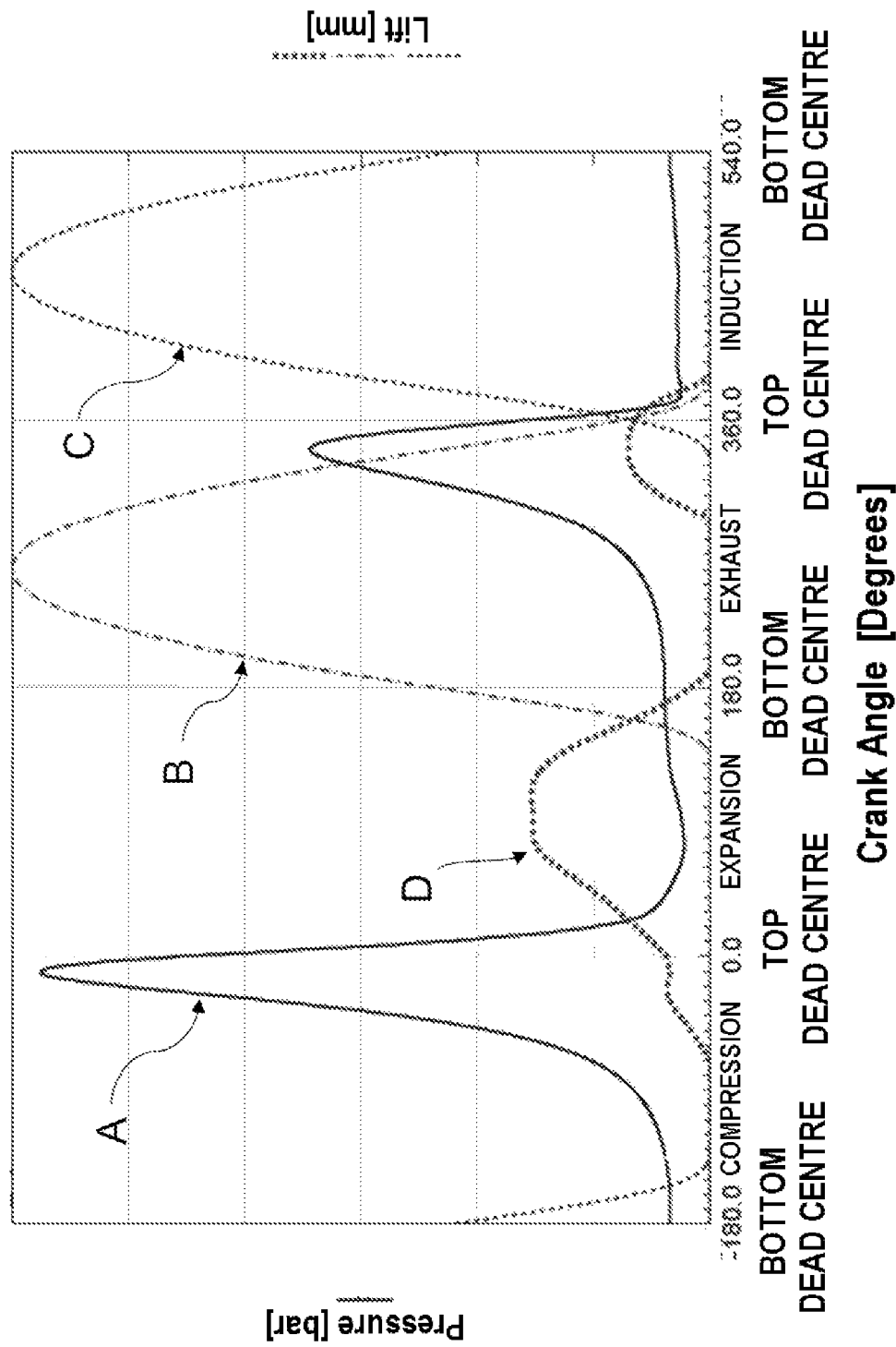
FIG. 5 shows an example of a valve timing diagram of the variable valve gear.

The control of the first exhaust valve 20 and its influence on a cylinder pressure are described below, referring to FIG. 5. FIG. 5 shows a full four-stroke cycle comprising compression, expansion, exhaust and induction.

The curve A describes the characteristic curve of the cylinder pressure in the engine-braking mode when the second cam 34 is in operative connection with the first exhaust valve 20. The curve B shows the characteristic curve of the valve lift of the first exhaust valve 20 when the first cam 32 is in contact with the first exhaust valve 20 (i.e. during the normal operating mode). The third curve C shows the characteristic curve of the valve lift of an intake valve both during the normal operating mode and in the engine-braking mode. The curve D shows the characteristic curve of the valve lift of the first exhaust valve 20 when the second cam 34 is in operative connection with the first exhaust valve 20 (i.e. during the engine-braking mode).

The curve B shows that in the normal operating mode the exhaust valve is open during the exhaust stroke. The curve C shows that in the normal operating mode and in the braking mode the intake valve is open during the induction stroke (intake stroke).

The curve D shows that the exhaust valve is opened slightly towards the end of the compression stroke in the area of the top dead centre at around 60° CA to 100° CA before the top dead centre. At the top dead centre the exhaust valve is opened further and closes at the end of the expansion stroke approximately at the bottom dead centre. The opening of the exhaust valve towards the end of the compression stroke causes the compressed air in the cylinder to be expelled through the opened exhaust valve into the exhaust system by the piston moving towards the top dead centre. The compression work previously performed brakes the crankshaft and therefore the combustion engine. The cylinder pressure at first increases during the compression stroke, but then falls due to the opening of the exhaust valve even before the top dead centre is reached (cf. curve A). The open exhaust valve during the expansion stroke causes air to be sucked out of the exhaust pipes into the cylinder. At the end of the expansion stroke the cylinder is substantially filled with air from the exhaust system.

The curve D moreover shows that after reaching the bottom dead centre at the end of the expansion stroke the exhaust valve initially remains closed. Towards the end of the exhaust stroke the exhaust valve opens in the area of the top dead centre. The opening again occurs at around 60° CA to 100° CA before the top dead centre. The closed exhaust valve during the first portion of the exhaust stroke causes the air drawn in during the expansion stroke to be compressed, thereby performing work. The cylinder pressure increases (curve A). The compression work brakes the crankshaft and therefore the combustion engine. The opening of the exhaust valve towards the end of the exhaust stroke leads to expelling of the air through the opened exhaust valve into the exhaust system. During the induction stroke the cylinder is again filled with air through the opened intake valve(s) (curve C). The cycle begins again.

As explained above, the use of the second cam for controlling the exhaust valve results in a two-fold compression with subsequent decompression, thereby affording an engine-braking function.

As emerges from a comparison of the curves B and D, the valve lift of the exhaust valve in the braking mode (curve D) is less than in the normal operating mode (curve B). The valve lift is moreover two-stage as the exhaust valve opens during the compression and expansion stroke. Since high stress-loading on the valve gear can occur due to opening of the exhaust valve against the pressure in the cylinder, these measures mean that the stress on the variable valve gear in the braking mode is reduced.

Figure 6A:
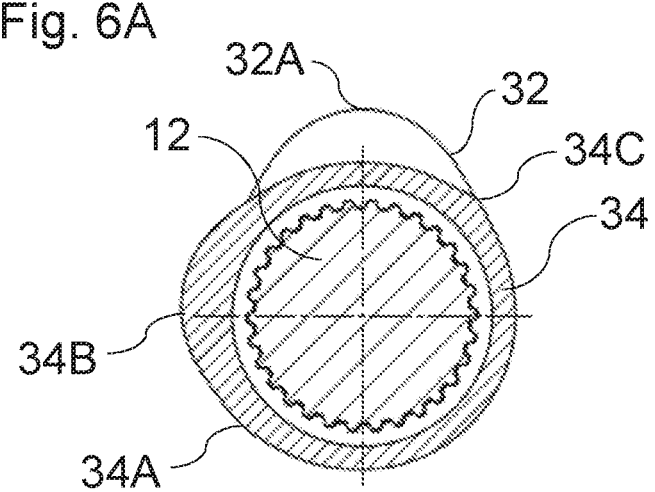
FIG. 6A shows a first view in cross section of the camshaft in FIG. 4 along the line B-B.
Figure 6B:
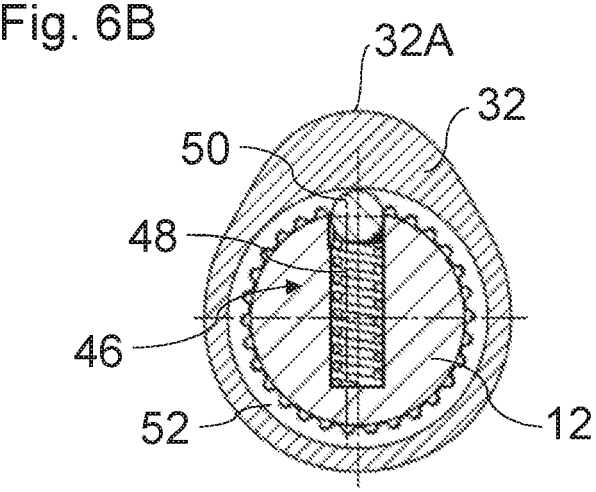
FIG. 6B shows a second view in cross section of the camshaft in FIG. 4 along the line C-C.

FIG. 6A shows a cross section through the second cam 34. FIG. 6B shows a cross section through the first cam 32.

The second cam 34 is designed to produce the curve D in FIG. 5. For this purpose, the second cam 34 comprises, in particular, a first lobe 34A, a second lobe 34B and a third lobe 34C. The first, second and third lobes 34A-34C are arranged offset in a circumferential direction around the second cam 34. The first lobe 34A leads to the opening of an exhaust valve at the end of the compression stroke. The second lobe 34B, which extends from the first lobe 34A, leads to wider opening of an exhaust valve during the expansion stroke. The third lobe 34C leads to opening of an exhaust valve at the end of the exhaust stroke.

The first lobe 34A has the smallest height of the lobes 34A-34C, measured in a radial direction of the camshaft 12. The second lobe 34B has the greatest height of the lobes 34A-34C, measured in a radial direction of the camshaft 12. The third lobe 34C is smaller than the second lobe 34B and larger than the first lobe 34A. Different heights of the lobes 34A-34C lead to corresponding variations in the valve lifts (cf. FIG. 5).

The first, second and third lobes 34A-34C are each arranged circumferentially offset in relation to a lobe 32A of the first cam 32. The first cam 32 is designed to produce the curve B in FIG. 5. The lobe 32A of the first cam 32 leads to opening of an exhaust valve during the exhaust stroke. The lobe 32A is higher, measured in a radial direction of the camshaft 12, than the lobes 34A-34C. The valve lift produced by the lobe 32A is greater than those produced by the lobes 34A-34C.

FIG. 6B moreover shows the arresting mechanism 46 with the elastic element 48, the detent 50 and the first recess 52.

A method for assisted upshifting, which utilizes the engine-braking function previously described, is described below referring to FIGS. 1, 2, 7 and 8.

Figure 7:
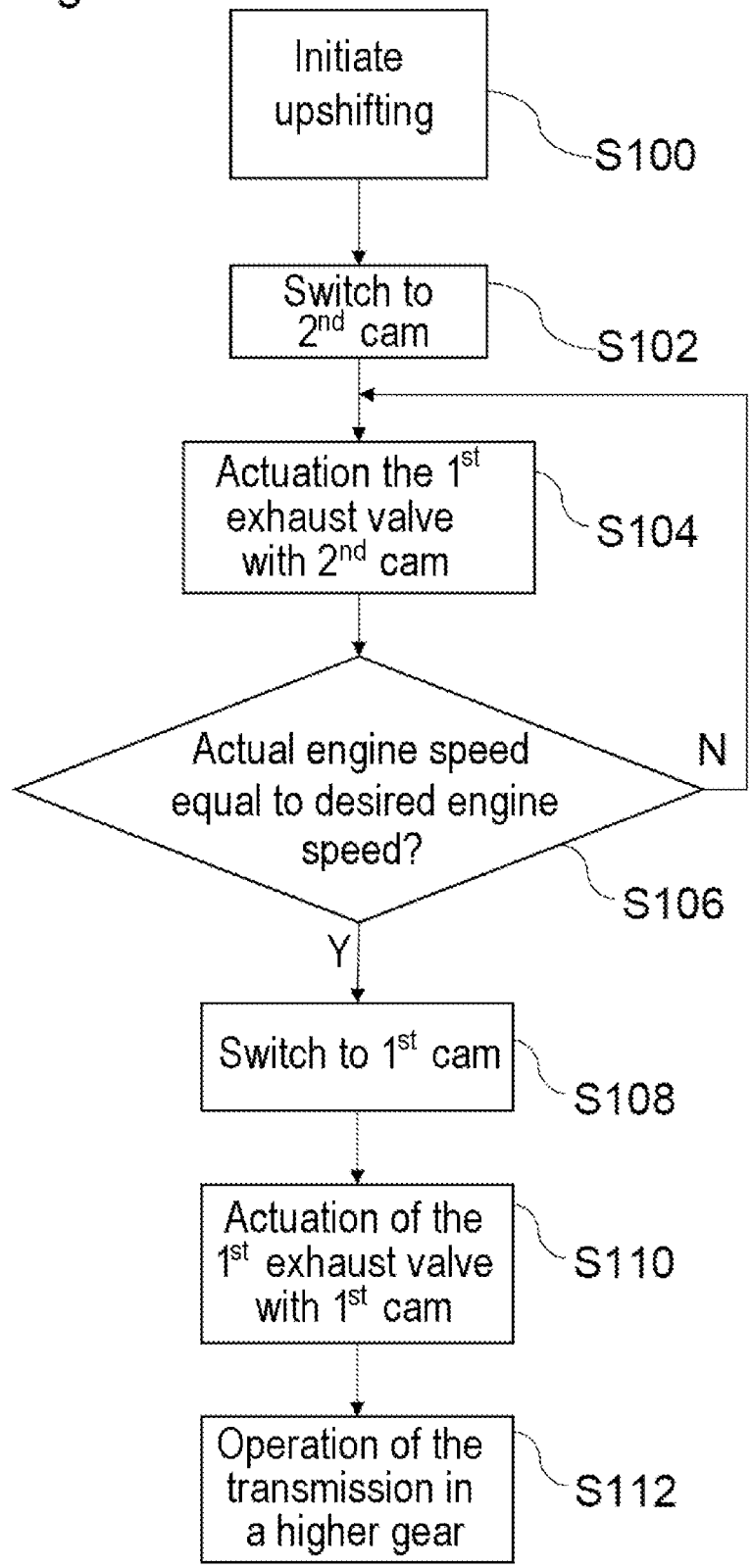
FIG. 7 shows an example of the method for assisted upshifting in gear changes according to the present disclosure.

FIG. 7 shows an example of the method for assisted upshifting. The method commences at step S100 with the initiation of an upshifting process. When using an automatic transmission, it is possible to determine, for example on the basis of an engine speed and/or a throttle valve position, that there is a need to shift to a higher gear with a higher transmission ratio. The transmission, for example, may be an automatic dual clutch transmission of a commercial vehicle, for example a truck or a bus. The higher transmission ratio of the higher gear leads to a reduced transmission speed. For this reason, an engine speed must be reduced in order to shift to the higher gear. The faster the engine speed can be reduced, the shorter the time taken to complete the gear shifting process.

In order to reduce the engine speed, the trip cam system 11 switches from the first cam 32 to the second cam 34 in step S102. The first exhaust valve 20 is thereby then actuated by the second cam 34 (step S104). The two-fold decompression, which is produced by the second cam 34, leads to a rapid reduction of the engine speed.

The second cam 34 is used to actuate the first exhaust valve 20 until such time as the actual engine speed equates to a desired engine speed. The desired engine speed may substantially correspond to a transmission speed with the higher gear engaged.

In step S106 it is verified whether a predefined shift condition is fulfilled. This might appropriately be whether the actual engine speed is equal to the desired engine speed. If the actual engine speed is not equal to the desired engine speed, the first exhaust valve 20 is further actuated by the second cam 34, so that the engine speed can be further reduced. If the actual engine speed does correspond to the desired engine speed, a switch to the first cam 32 occurs in step S108. Consequently, the first exhaust valve 20 is then actuated by the first cam 32 (step S110).

The speed approximation between the engine speed and the transmission speed means that the transmission can then be operated in the higher gear (step S112) and the upshifting process can be completed.

Figure 8:
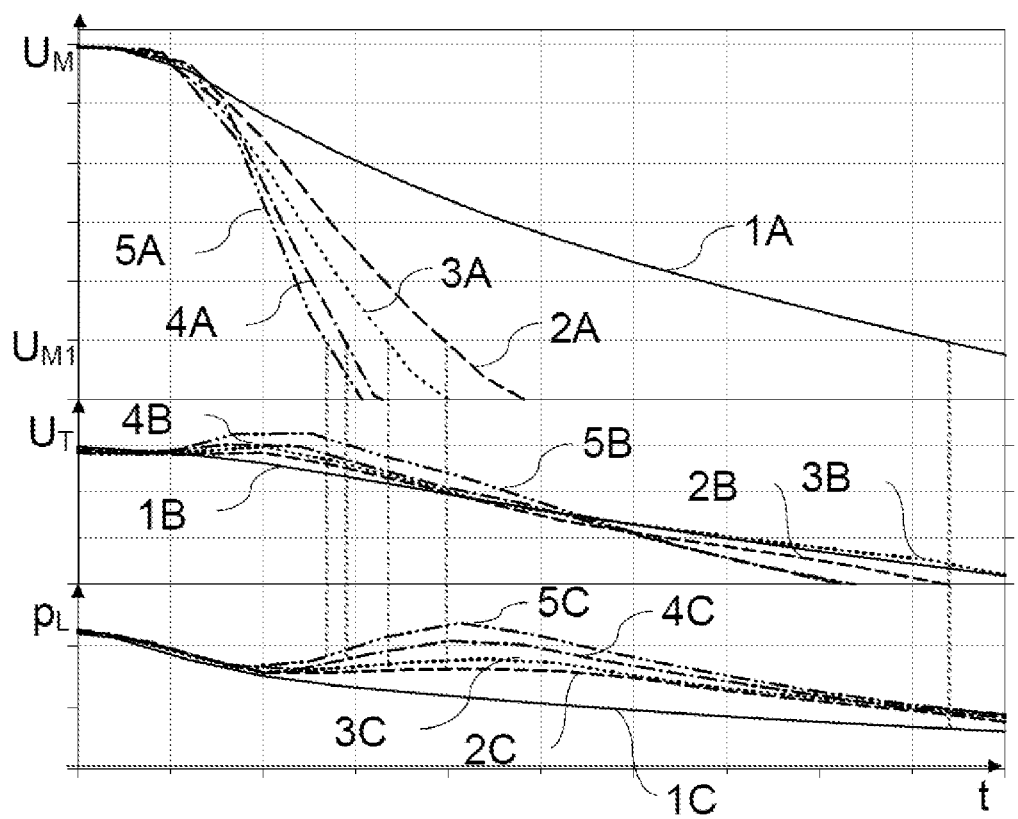
FIG. 8 shows a diagram, which shows various engine speed characteristic curves, turbocharger speed characteristic curves and boost pressure characteristic curves as a function of the time.

FIG. 8 shows engine speed characteristic curves, turbocharger speed characteristic curves and boost pressure characteristic curves obtainable with the method.

In detail, FIG. 8 shows five different engine speed characteristic curves 1A-5A, five different turbine speed characteristic curves 1B-5B and five different boost pressure characteristic curves 1C-5C. The turbine speed characteristic curves 1B-5B relate to the speed of a turbine of an exhaust turbocharger of the combustion engine. The boost pressure characteristic curves relate to a boost pressure provided by the compressor of the exhaust turbocharger.

The five curves for the engine speed, the turbine speed and the boost pressure in each case relate, among other things, to various embodiments of the method for assisted upshifting disclosed herein. The dashed curves 2A, 2B and 2C relate to characteristic curves that can be obtained when two cylinders of a six-cylinder combustion engine are used for the assisted upshifting. In other words, only two of the six cylinders are actuated by the corresponding second cam 34 during the upshifting process. That is to say only two of the six cylinders are operated in an engine-braking mode during the upshifting process. The dotted curves 3A, 3B, 3C, the dash-dot curves 4A, 4B, 4C and the dash-double dot curves 5A, 5B, 5C accordingly relate to embodiments in which three, four or all of the cylinders are operated in an engine-braking mode by the trip cam system 11 during the upshifting process. For comparison, the solid curves 1A, 1B, 10 show a characteristic curve in which no cylinder is operated in an engine-braking mode during the upshifting process.

Comparing the characteristic curves 1A-5A it can be seen that the use of the engine-braking mode is capable of significantly reducing the engine speeds (curve 1A compared to curves 2A-5A). For example, simply switching two cylinders to the engine-braking mode during the upshifting process more than halves the time taken to reduce the speed to around 1000 rpm at $U_{M1}$. Switching further cylinders to the engine-braking mode in each case leads to a further reduction in the time taken to reduce the speed to 1000 rpm, for example. With each further cylinder in engine-braking mode the effect becomes less (curve 2A compared to curve 3A compared to curve 4A compared to curve 5A).

The absence of an exhaust throttle valve used for engine braking when upshifting moreover has a positive influence on a turbocharger speed and a boost pressure of the turbocharger during the upshifting process. Without the engine-braking mode disclosed here a turbocharger speed (curve 1B) and a boost pressure (curve 10) gradually fall during the upshifting process. The low boost pressure may be perceived as a turbocharger lag after shifting to the higher gear.

On the other hand, using the engine-braking mode afforded by the trip cam system 11, for example, exerts a positive influence on the turbocharger speed and the boost pressure during the upshifting process, so that only a reduced and preferably no turbocharger lag is perceivable after engaging the higher gear. One reason for this is that no exhaust throttle valve is used for the engine-braking mode, which in restricting the exhaust gas mass flow also reduces a speed of the turbine of the turbocharger. On the other hand, it is due to the fact that, because of the two-fold decompression, the number of cylinders which are operated in the engine-braking mode during the upshifting process expel compressed air into the exhaust tract twice during one working cycle. This is the case towards the end of the compression stroke and towards the end of the exhaust stroke, when the second cam 34 opens the first exhaust valve 20. The compressed air is capable of driving the turbine of the turbocharger. Accordingly, the effect is all the greater, the more cylinders are used in the engine-braking mode during the upshifting process.

The greater the number of cylinders that are switched to the engine-braking mode during the upshifting process, the more a turbocharger speed $U_T$ can be increased in the interim, as a comparison of the characteristic curves 2B-5B shows.

The greater the number of cylinders that are switched to engine-braking mode during the upshifting process, the greater the scope for preventing a fall in the boost pressure $p_L$, and maintaining or even increasing the boost pressure $p_L$, as a comparison of the characteristic curves 2C-5C shows. In addition, a higher boost pressure $p_L$ can be attained in a shorter time at a threshold speed, for example 1.6, as can be seen with the aid of the vertical dotted lines in FIG. 8.

The method for assisted upshifting disclosed herein can be modified and supplemented in a variety of ways.

For example, it is possible to make an actuation of the first exhaust valve 20 by the second cam 34 conditional upon various parameters. It can therefore be determined, on the one hand, whether the first exhaust valve 20 is actuated by the second cam 34 at all, and if so how many cylinders are used in the engine-braking mode. A balance can thereby be struck between material wear to the variable valve gear 10 and a rapid upshifting process. Such parameters may be, in particular, a required speed reduction and torque increase during the upshifting process. Additional parameters that may enter into consideration are, for example, a desired duration of the upshifting process, a desired turbocharger speed and/or a desired boost pressure.

The greater the required speed reduction, the greater the required torque increase, the shorter the desired duration of the upshifting process, the greater the desired turbocharger speed, and the greater the desired boost pressure, the greater the number of cylinders that may be switched to the engine-braking mode. For example, it is possible to store corresponding threshold values for specific operating conditions of the combustion engine, on the basis of which it is determined whether and how many cylinders are operated in the engine-braking mode during the upshifting process. The threshold values may relate to required speed reductions, required torque increases, desired upshifting durations, desired turbocharger speeds and/or desired boost pressures.

If only a very slight speed reduction is required, for example, it may be possible to dispense with the switch to engine-braking mode.

If an especially brief upshifting duration is desired, for example, it can be determined how many cylinders are to be switched to the engine-braking mode during the upshifting process in order to achieve the desired duration of the upshifting process.

It is also feasible, given a plurality of trip cam systems 11, for a first group of trip cam systems 11 to actuate the corresponding first exhaust valve 20 by means of the corresponding second cam 34 during the upshifting process. A second group of trip cam systems 11, on the other hand, actuates the corresponding first exhaust valve 20 by means of the corresponding first cam 32. An assignment to the groups can be done on a rolling basis between successive upshifting processes or during a single upshifting process. This makes it possible to spread the material wear evenly between the trip cam systems 11.

The method disclosed herein can preferably be used for assisted upshifting with a combustion engine of a commercial vehicle and with large engines in general, since here the time taken for upshifting may be relatively long.

As explained above, the method for assisted upshifting of the combustion engine may use the trip cam system 11. In particular, the control unit 27 may control the actuators 24 and 26 according to the method for assisted upshifting of the combustion engine disclosed herein. However, the method may also use another variable valve gear to provide the engine brake. It is also feasible to use another system for corresponding actuation of the exhaust valves, in which a first exhaust valve of the combustion engine is at first kept closed during the compression stroke and/or the exhaust stroke for the compression of air and is opened before reaching a top dead centre of a piston movement for decompression of the compressed air.

The invention is not limited to the preferred exemplary embodiments described above, a number of variants and modifications instead being possible, which likewise make use of the idea of the invention and therefore fall within the scope of the invention. In particular, the invention also claims protection for the subject matter and for the features of the dependent claims, irrespective of the claims referred to.

LIST OF REFERENCE NUMERALS

10 variable valve gear
11 trip cam system
12 camshaft
14 cam carrier
16 first transmission device (first finger-type rocker)
18 second transmission device (second finger-type rocker)
18A contact area
20 first exhaust valve
20 second exhaust valve
22 first actuator
24 second actuator
26 control unit
28 first stop
30 second stop
32 first cam
32A lobe
34 second cam
34A-34C lobes
36 third cam
38 first cam-free portion
40 second cam-free portion
42 first meshing channel
44 second meshing channel
46 arresting mechanism
48 elastic element
50 detent
52 first recess
54 second recess
A cylinder pressure
B exhaust valve control curve
C intake valve control curve
D exhaust valve control curve
1A-5A various engine speed characteristic curves
1B-5B various turbine speed characteristic curves
1C-5C various boost pressure characteristic curves

The invention claimed is:
1. A method for assisted upshifting in a gear change of a transmission connected to a combustion engine, comprising:
initiating an upshifting process;

reducing an engine speed of the combustion engine by switching to an engine-braking mode, wherein,
- a) a variable valve gear, in particular a trip cam system, of the combustion engine serves for switching to the engine-braking mode; and
- b) in the engine-braking mode a first exhaust valve of the combustion engine is at first kept closed during the compression stroke and/or during the exhaust stroke for the compression of air and is opened before reaching a top dead centre of a piston movement for decompression of the compressed air; and keeping a second exhaust valve of the combustion engine closed during the upshifting process, wherein the second exhaust valve is assigned to the same cylinder of the combustion engine as the first exhaust valve.

2. The method according to claim 1, further comprising:
maintaining and/or increasing a boost pressure and/or a turbocharger speed of a turbocharger of the combustion engines by expelling the compressed air to an exhaust-gas turbine of the turbocharger during the compression stroke and/or during the exhaust stroke through opening of the first exhaust valve before reaching the top dead centre the piston movement.

3. The method according to claim 1, further comprising:
sensing of a required speed reduction for the upshifting process, a required torque increase for the upshifting process, a desired duration of the upshifting process, a desired turbocharger speed, particularly at the end of the upshifting process and/or a desired boost pressure, particularly at the end of the upshifting process, and wherein the step of reducing the engine speed of the combustion engine by switching to the engine-braking mode is performed as a function of the required speed reduction, the required torque increase, the desired duration of the upshifting process, the desired turbocharger speed and/or the desired boost pressure.

4. The method according to claim 1, wherein:
a first group of cylinders is switched to the engine-braking mode during the upshifting process; and
a second group of cylinders of the combustion engine continues to be operated in the normal operating mode during the upshifting process.

5. The method according to claim 4, wherein a number of cylinders in the first group and/or the second group is determined as a function of a required speed reduction, a required torque increase, a desired duration of the upshifting process, a desired turbocharger speed and/or a desired boost pressure.

6. The method according to claim 5, wherein an assignment to the first group and/or to the second group is made on a rolling basis, in particular between successive upshifting processes.

7. The method according to claim 1, wherein in the engine-braking mode the first exhaust valve opens at between 100° crankshaft angle (CA) and 60° CA before reaching the top dead center, and after opening during the exhaust stroke closes in the range between the top dead center and 30.degree. CA after the top dead centre, and/or after opening during the compression stroke closes in the range between the bottom dead centre and 30° CA after the bottom dead centre.

8. The method according to claim 1, wherein keeping the second exhaust valve closed comprises a switch to a cam-free portion of the trip cam system.

9. The method according to claim 1, wherein the trip cam system comprises a first cam for a normal operating mode of the combustion engine and a second cam for the engine-braking mode of the combustion engine, wherein the trip cam system places either the first cam and the first exhaust valve in operative connection, or the second cam and the first exhaust valve in operative connection.

10. The method according to claim 9, wherein the switching to the engine-braking mode comprises:
switching-over from the first cam to the second cam by the trip cam system; and
actuating the first exhaust valve by means of the second cam, which at first keeps the first exhaust valve closed during the compression stroke and/or during the exhaust stroke and opens it before reaching the top dead centre of the piston movement.

11. The method according to claim 9, further comprising:
switching-over from the second cam to the first cam by the trip cam system when the engine speed has been reduced to a desired speed, in particular a transmission speed of the transmission.

12. The method according to claim 1, wherein:
the upshifting process is initiated automatically as a function of an engine speed and/or a throttle valve position; and/or
the transmission is shifted from one gear to another gear with a higher transmission ratio during the upshifting process.

13. A variable valve gear for a combustion engine of a motor vehicle, in particular a commercial vehicle, comprising:
a first exhaust valve;
a camshaft;
a trip cam system having a cam carrier, which is arranged so that it is rotationally fixed and axially displaceable on the camshaft and comprises a first cam and a second cam, wherein the first cam and the second cam are arranged offset in a longitudinal direction the camshaft; and a control unit, which is configured to initiate an upshifting process;
reduce an engine speed of the combustion engine by switching to an engine-braking mode, wherein,
- a) a variable valve gear, in particular the trip cam system, of the combustion engine serves for switching to the engine-braking mode; and
- b) in the engine-braking mode a first exhaust valve of the combustion engine is at first kept closed during the compression stroke and/or during the exhaust stroke for the compression of air and is opened before reaching a top dead centre of a piston movement for decompression of the compressed air; and keep a second exhaust valve of the combustion engine closed during the upshifting process, wherein the second exhaust valve is assigned to the same cylinder of the combustion engine as the first exhaust valve.

14. A motor vehicle, in particular a commercial vehicle, having a variable valve gear, the variable valve gear comprising:
a first exhaust valve;
a camshaft;
a trip cam system having a cam carrier, which is arranged so that it is rotationally fixed and axially displaceable on the camshaft and comprises a first cam and a second cam, wherein the first cam and the second cam are arranged offset in a longitudinal direction the camshaft; and
a control unit, which is configured to initiate an upshifting process;
reduce an engine speed of the combustion engine by switching to an engine-braking mode, wherein, a) a variable valve gear, in particular the trip cam system, of the combustion engine serves for switching to the engine-braking mode; and
b) in the engine-braking mode a first exhaust valve of the combustion engine is at first kept closed during the compression stroke and/or during the exhaust stroke for the compression of air and is opened before reaching a top dead centre of a piston movement for decompression of the compressed air; and
keep a second exhaust valve of the combustion engine closed during the upshifting process, wherein the second exhaust valve is assigned to the same cylinder of the combustion engine as the first exhaust valve.

15. A method for assisted upshifting in a gear change of a transmission connected to a combustion engine, comprising:
initiating an upshifting process;
reducing an engine speed of the combustion engine by switching to an engine-braking mode, wherein,
a) a variable valve gear, in particular a trip cam system, of the combustion engine serves for switching to the engine-braking mode; and
b) in the engine-braking mode a first exhaust valve of the combustion engine is at first kept closed during the compression stroke and/or during the exhaust stroke for the compression of air and is opened before reaching a top dead centre of a piston movement for decompression of the compressed air; and
maintaining and/or increasing a boost pressure and/or a turbocharger speed of a turbocharger of the combustion engines by expelling the compressed air to an exhaust-gas turbine of the turbocharger during the compression stroke and/or during the exhaust stroke through opening of the first exhaust valve before reaching the top dead centre the piston movement.

16. A method for assisted upshifting in a gear change of a transmission connected to a combustion engine, comprising:
initiating an upshifting process;
reducing an engine speed of the combustion engine by switching to an engine-braking mode, wherein,
a) a variable valve gear, in particular a trip cam system, of the combustion engine serves for switching to the engine-braking mode; and
b) in the engine-braking mode a first exhaust valve of the combustion engine is at first kept closed during the compression stroke and/or during the exhaust stroke for the compression of air and is opened before reaching a top dead centre of a piston movement for decompression of the compressed air;
and wherein,
a first group of cylinders is switched to the engine-braking mode during the upshifting process; and
a second group of cylinders of the combustion engine continues to be operated in the normal operating mode during the upshifting process.

17. A method for assisted upshifting in a gear change of a transmission connected to a combustion engine, comprising:
initiating an upshifting process;
reducing an engine speed of the combustion engine by switching to an engine-braking mode, wherein,
a) a variable valve gear, in particular a trip cam system, of the combustion engine serves for switching to the engine-braking mode; and
b) in the engine-braking mode a first exhaust valve of the combustion engine is at first kept closed during the compression stroke and/or during the exhaust stroke for the compression of air and is opened before reaching a top dead centre of a piston movement for decompression of the compressed air;
and wherein,
in the engine-braking mode the first exhaust valve opens at between 100° crankshaft angle (CA) and 60° CA before reaching the top dead center, and after opening during the exhaust stroke closes in the range between the top dead center and 30.degree. CA after the top dead centre, and/or after opening during the compression stroke closes in the range between the bottom dead centre and 30° CA after the bottom dead centre.

18. A method for assisted upshifting in a gear change of a transmission connected to a combustion engine, comprising:
initiating an upshifting process;
reducing an engine speed of the combustion engine by switching to an engine-braking mode, wherein,
a) a variable valve gear, in particular a trip cam system, of the combustion engine serves for switching to the engine-braking mode; and
b) in the engine-braking mode a first exhaust valve of the combustion engine is at first kept closed during the compression stroke and/or during the exhaust stroke for the compression of air and is opened before reaching a top dead centre of a piston movement for decompression of the compressed air; and
and wherein
the trip cam system comprises a first cam for a normal operating mode of the combustion engine and a second cam for the engine-braking mode of the combustion engine, wherein the trip cam system places either the first cam and the first exhaust valve in operative connection, or the second cam and the first exhaust valve in operative connection.

* * * * *